June 21, 1932.  T. W. JOHNSON  1,864,198
APPARATUS FOR TREATING FRUIT TREES
Filed Aug. 13, 1930  3 Sheets-Sheet 1

Inventor
Thomas W. Johnson
By Lyon & Lyon
Attorneys

June 21, 1932. T. W. JOHNSON 1,864,198
APPARATUS FOR TREATING FRUIT TREES
Filed Aug. 13, 1930 3 Sheets-Sheet 2

Inventor
Thomas W. Johnson
By Lyon & Lyon
Attorneys

June 21, 1932.  T. W. JOHNSON  1,864,198
APPARATUS FOR TREATING FRUIT TREES
Filed Aug. 13, 1930   3 Sheets-Sheet 3

Inventor
Thomas W. Johnson
By Lyon & Lyon
Attorneys

Patented June 21, 1932

1,864,198

UNITED STATES PATENT OFFICE

THOMAS W. JOHNSON, OF MOUNTAIN VIEW, CALIFORNIA

APPARATUS FOR TREATING FRUIT TREES

Application filed August 13, 1930. Serial No. 475,005.

This invention relates to an apparatus by means of which the productivity of fruit trees and orchards may be increased, and by means of which the destruction of fruit by mould or rot is prevented.

The apparatus is particularly adapted for the treatment of fruit trees in orchards in a rapid and effective manner, whereby the production of good fruit from the trees is increased. This application is a continuation in part of a co-pending application, Serial No. 351,894, Patent No. 1,783,430.

Substantially all blossoms of fruit trees, such as the apricot, peach, apple, plum, almond, etc., include a calyx ring or outer circle of the floral envelopes. After the blossoms fall the calyx ring is retained and the fruit begins to form within the ring and the calyx is gradually displaced and eventually dislodged by the growing fruit.

It has been discovered that the fruit crops are heavily damaged and the productivity of orchards and fruit trees materially reduced unless the calyx ring (otherwise known as the jacket or shuck) is removed soon after the young fruit begins to form therein.

If the calyx or jacket is not removed and instead the fruit tree is subjected to a rain or a heavy precipitation of dew, the moisture retained beneath, in or on the jacket or calyx causes a mould and/or rot. If the jacket or calyx is allowed to remain on the young, growing fruit with the moisture therebeneath, thereon or therein, the mould prevents the fruit from growing and causes destruction thereof by rot or decay. These conditions are, of course, most pronounced in certain parts of the county where rains occur during or immediately after the trees are in bloom, or where the orchards are subjected to heavy fogs or dews, as along the coast of California. The damage caused by mould or rot of this sort, engendered beneath in, or on the calyx, has been known to reduce the crop by seventy-five per cent during certain years. It is to be understood that if the young fruit are not subjected to rain or moisture, then the jacket or calyx will become dry and fall off naturally.
Furthermore, fruit orchards, particularly apricot, almond, plum and peach, are subject to the ravages of the curculio, which apparently thrives during that period of time that the trees are in bloom and immediately thereafter. It has been found very difficult to free orchards from this insect, as the use of arsenical sprays and other insecticides capable of acting upon the curculio is not advisable, these sprays adversely affecting the foliage, buds and young fruit.

The apparatus embraced by this invention is adapted for the removal of a calyx, shuck or jacket from the young fruit and the moisture therebeneath, therein or thereon, so as to prevent the development of mould and rot thereunder.

Another object of the invention is to disclose and provide an apparatus which is particularly adapted for use in groves or orchards whereby adjoining parallel rows of trees may be simultaneously subjected to an artificial current of air to remove the calyx or jacket and moisture from the young fruit. A still further object is to disclose and provide a portable, adjustable apparatus whereby groves may be treated with dusting agents carried on an artificial current of air.

In describing the apparatus embraced by this invention, reference will be had to the appended drawings, in which.

Figure 1:
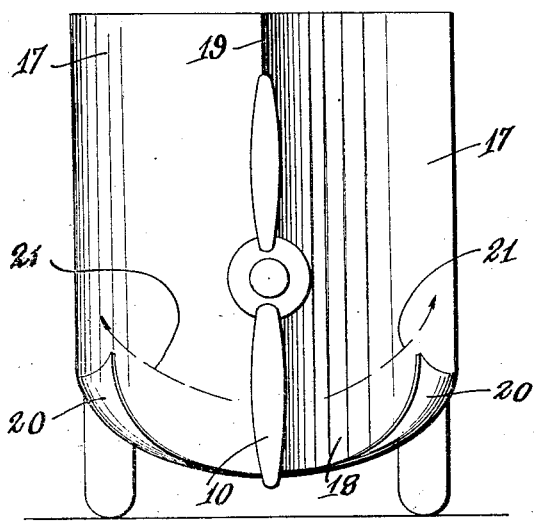
Fig. 1 illustrates young apricots with the calyx thereon.

Referring to the drawings, particularly to Fig. 1, there is illustrated a branch of an apricot tree 1, bearing a very young apricot fruit 2 and a slightly larger apricot 3. 4 and 5 represent the jackets, shucks or calyx rings, the calyx 4 being rather firmly in position upon the fruit 2, whereas the calyx 5 is in the process of being thrown off by the growth of the fruit.

Fruit in the stage shown in Fig. 1 are subject to the development of mould beneath the calyx rings 4 and 5, as has been stated hereinabove, and it is the object of this invention to provide means whereby such calyx rings or jackets and moisture therebeneath, therein or thereon may be removed.

Figure 2:
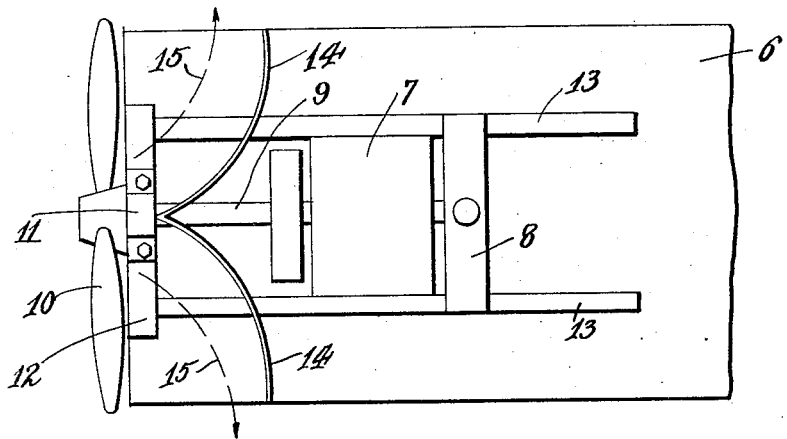
Fig. 2 is a plan view of one form of apparatus adapted to be used in carrying out the method.
Figure 3:
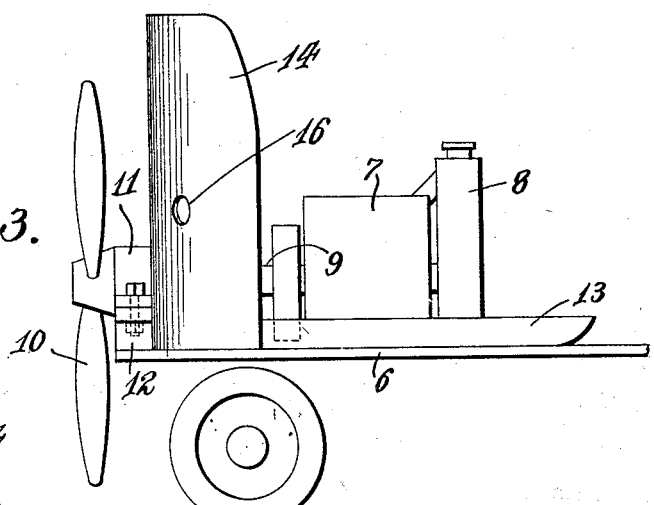
Fig. 3 is a side elevation of the apparatus shown in Fig. 2.
Figure 4:
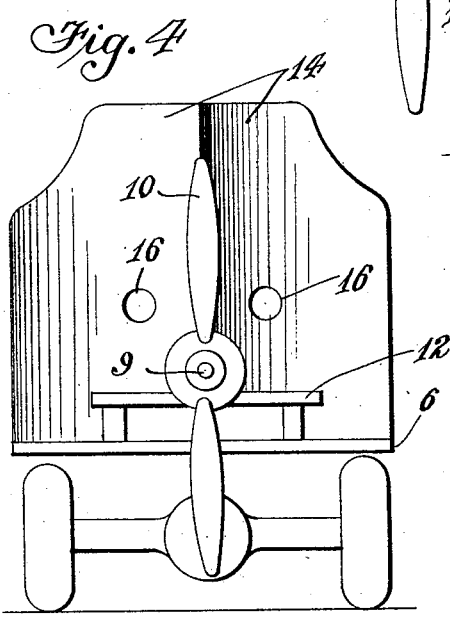
Fig. 4 is a front elevation of the apparatus shown in Figs. 2 and 3.

The apparatus illustrated in Figs. 2, 3 and 4 is preferably mounted upon a suitable portable base, such as for example, a truck body 6 and preferably at the rear thereof. The apparatus may include a suitable power imparting means such as a motor 7 which, as is illustrated in the drawings, may be an internal combustion water cooled engine. Such power means 7 may be operably connected to a radiator 8 and also connected, as by means of a suitable shaft 9 with a propeller 10. The shaft 9 may be journaled in a block 11 attached to a cross member 12, which in turn may be attached to the truck body 6. The propeller, shaft, motor, etc., may all be mounted upon skids 13, so as to facilitate the removal of the apparatus from the truck.

It will be noticed that the apparatus shown in Figs. 2 to 4 includes a propeller mounted upon a shaft extending longitudinally of the truck or other portable means 6. In order to effectively utilize the apparatus a deflector 14 is preferably positioned on the truck body 6, and in operative relation with the apparatus thereon, so as to cause the air set in motion by the air screw or propeller 10 to be deflected as indicated by the arrows 15, to each side of the longitudinal axis of the truck or other portable support 6. This construction permits that the apparatus be moved between adjoining rows of fruit trees and simultaneously subject both rows of trees to a current of air of sufficient intensity to blow off and remove the calyx rings adhering to the young fruit.

If desired, apertures, as the apertures 16 may be provided in the wind deflector 14 so as to direct some air currents against or into contact with the motor 7, thereby assisting in the cooling of said motor.

Figure 5:
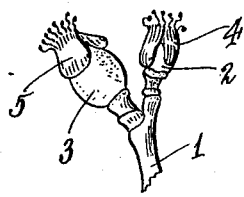
Fig. 5 is a front elevation of a modified form of apparatus.
Figure 6:
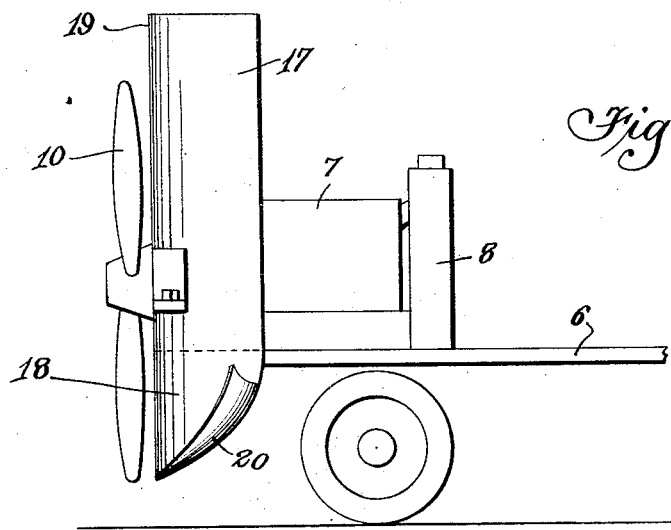
Fig. 6 is a side elevation of the modified form of apparatus shown in Fig. 5.

As shown in Figs. 5 and 6, a modified form of apparatus may include a motor 7 mounted upon the rear portion of a truck, trailer or other movable member 6, said motor 7 being operatively connected to an air screw or propeller 10 having a wind deflector 17 extending below the level of the truck or trailer body 6, as is indicated at 18.

The wind deflector 17 may be provided with an apex 19 substantially directly back of the axis of the air screw or propeller 10, the sides of the deflector 17 curving outwardly from the apex 19 in the manner of the deflector 14 illustrated in Fig. 2. The lower portion of the deflector 17 may be provided with outwardly and upwardly inclined portions 20, by means of which air displaced by the propeller 10 may be deflected both outwardly and upwardly, as indicated by the arrow 21. The modified form of apparatus shown in Figs. 5 and 6, therefore, distributes and directs the air displaced by the propeller 10 with greater effectiveness than the wind deflector 14, shown in position on the apparatus illustrated in Figs. 2, 3 and 4, directing said air upwardly, which more effectively causes the removal of the calyx rings from the fruit.

It is to be understood that it is not essential that the apparatus be mounted upon a truck or trailer in such manner as to have the longitudinal axis of the propeller shaft 9 lie in a plane substantially parallel to the longitudinal axis of the truck, trailer or other portable body 6. Instead the apparatus may be mounted upon a truck or trailer with the axis of the propeller shaft extending transversely to the lonigtudinal axis of the truck or trailer. Under these conditions, however, it is more difficult to subject adjoining rows of trees to a simultaneous current of air, (unless two apparati are mounted on the same truck or on connected trucks, so that the currents of air are directed to opposite sides of the truck).

Figure 7:
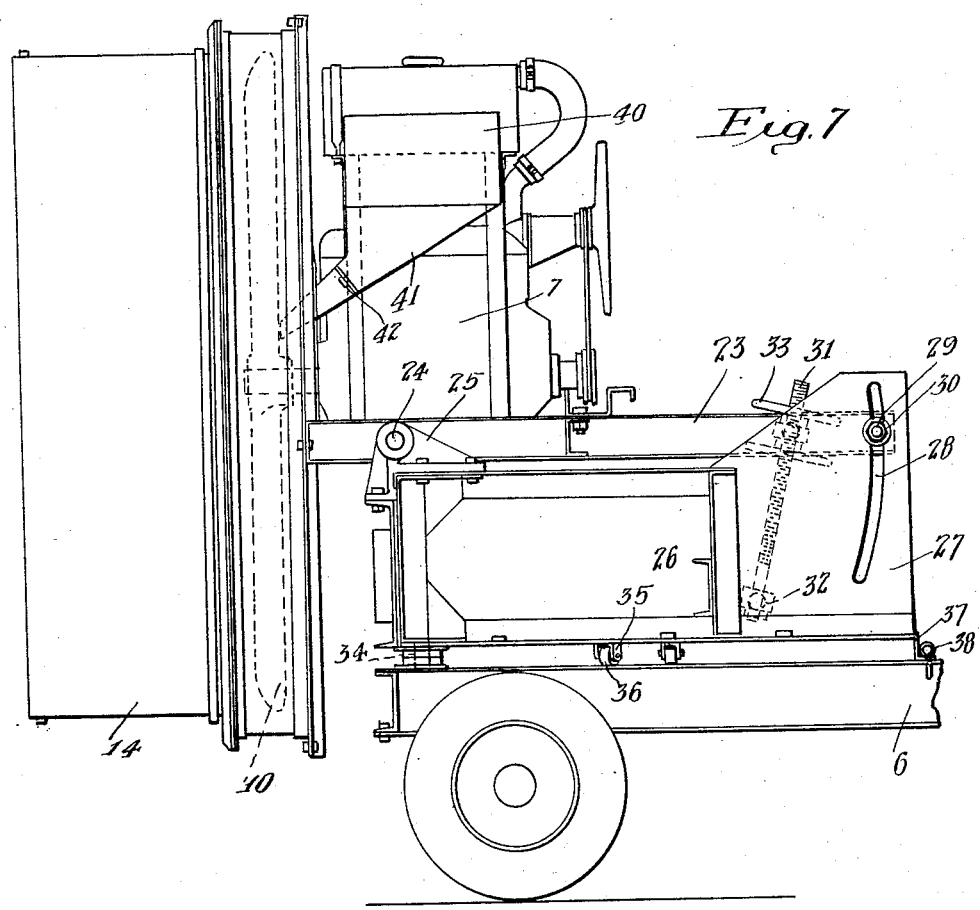
Fig. 7 is a side elevation of another form of apparatus embodied in this invention.

Means may be provided for adjustably directing the artificial current of air, and the form of apparatus shown in Fig. 7 embodies such means. The motor 7 may be mounted on a frame 23 pivotally carried on horizontal pins or trunnions 24 journaled in brackets 25 mounted on a carriage 26. Rearwardly extending side plates 27 carried by the carriage 26 may be provided with arcuate slots 28 adapted to receive bolts 29 carried by the rear end of the frame 23, whereby said frame may be angularly positioned with respect to the horizontal plane of the carriage 26 as by means of nuts 30.

In addition, means may be provided for adjustably moving the frame 23 on pivot pins 24, such as for example, a threaded shaft 31 pivotally connected to the carriage 26 as indicated at 32, and provided with hand wheels 33 threadedly mounted on the shaft 31 but rotatably and pivotally held in the frame 23. By loosening the nuts 30 and turning the hand wheels 33 the entire frame 23 with the motor, propeller 10 and deflector 14 may thus be angularly positioned with respect to the horizontal, so as to properly direct the current of air against the trees.

Furthermore, the carriage 26 may be mounted to move on a vertical pivot 34. The vertical pivot 34 may be carried by the body or base 6. The lower portion of the carriage 26 may also be provided with a plurality of downwardly extending yokes 35 having rollers 36 journaled therein, said yokes being positioned along an arcuate path having its center at the center of the pivot 34 so as to support the carriage 26 on the base 6 and facilitate movement of the carriage about the pivot 34.

The rear portion of the carriage 26 may be provided with a downwardly extending flange 37 provided with an aperture, and the base 6 may be provided with a plurality of spaced apertures positioned along an arcuate path having the pivot point 34 at its center. The carriage 26 may thus be pivotally positioned on the base 6 and maintained in any desired position as by means of a pin 38 passing through the flange 37 and extending into one of the apertures in the truck body or base 6.

The frame 23 may be provided with a receptacle 40 and a spout 41 having a slide valve 42 therein. The spout preferably extends to a point immediately in back of the propeller 10 and near the center thereof. The receptacle 40 may be filled with any suitable dusting material having insecticidal or fungicidal properties.

In actual operation, therefore, a quantity of the dusting material may be continuously fed to the artificial current of air created by the apparatus, thus distributing the dusting material on the trees or groves in a very effective, simple and economical manner.

It is to be understood that numerous changes and modifications may be made in the arrangement and combination of elements particularly described hereinabove, the apparatus consisting essentially of means for generating a current of air, and a substantially vertical deflector adapted to deflect such air current in substantially opposite directions.

I claim:

1. An apparatus adapted to subject adjoining rows of fruit trees to a current of air, comprising a propeller, means for driving said propeller, and a substantially vertical deflector positioned back of said propeller and between said propeller and driving means, said deflector being provided with upwardly curved outer and lower edges adapted to deflect air currents produced by said propeller upwardly and outwardly to both sides of said propeller.

2. An apparatus adapted to subject adjoining rows of fruit trees to a current of air, comprising a vehicle, an air screw mounted upon a shaft substantially parallel to the longitudinal axis of said vehicle, means operably connected to said shaft for driving said air screw, and a substantially vertical curved deflector carried by said vehicle and adapted to receive the air blast from said air screw and deflect said air blast outwardly in substantially opposite directions to both sides of said vehicle.

3. An apparatus adapted to subject adjoining rows of fruit trees to a current of air, comprising a vehicle, an air screw mounted upon a shaft substantially parallel to the longitudinal axis of said vehicle, and a substantially vertical deflector positioned back of said air screw and provided with upwardly curved outer and lower edges, said deflector being adapted to deflect air currents produced by said screw upwardly to both sides of said vehicle.

4. In an apparatus for subjecting fruit trees to an artificial current of air, the combination of a base, a carriage pivotally mounted on said base, means for angularly positioning said carriage in a horizontal plane, a frame pivotally mounted on said carriage, means for angularly positioning said frame in a vertical plane, means for generating a current of air of high velocity carried by said frame, and means carried by the frame for driving such current generating means.

5. In an apparatus for subjecting fruit trees to an artificial current of air, the combination of a base, a carriage pivotally mounted on said base, means for angularly positioning said carriage in a horizontal plane, a frame pivotally mounted on said carriage, means for angularly positioning said frame in a vertical plane, means for generating a current of air of high velocity carried by said frame, means for driving such current generating means, and means carried by said frame for supplying a dusting material to said current generating means.

6. An apparatus adapted to subject fruit trees to a current of air, comprising an air screw, means for driving said air screw, and a substantially vertical curved deflector adapted to receive air from said air screw and deflect said air outwardly in substantially opposite directions.

Signed at Mountain View, Cal., this 29th day of July, 1930.

THOMAS W. JOHNSON.